United States Patent
Yanase

(10) Patent No.: US 9,115,796 B1
(45) Date of Patent: Aug. 25, 2015

(54) DIFFERENTIAL DEVICE

(71) Applicant: MUSASHI SEIMITSU INDUSTRY CO., LTD., Toyohashi-shi, Aichi (JP)

(72) Inventor: Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 14/628,647

(22) Filed: Feb. 23, 2015

(30) Foreign Application Priority Data

Feb. 25, 2014 (JP) .................................. 2014-034364

(51) Int. Cl.
*F16H 48/40* (2012.01)
*F16H 48/08* (2006.01)
*F16H 57/029* (2012.01)

(52) U.S. Cl.
CPC ................ *F16H 48/40* (2013.01); *F16H 48/08* (2013.01); *F16H 57/029* (2013.01)

(58) Field of Classification Search
CPC ... F16H 48/08; F16H 48/40; F16H 2048/082; F16H 2048/085; F16H 57/0018; F16H 57/0025; F16H 57/0031
See application file for complete search history.

(56) References Cited

U.S. PATENT DOCUMENTS

| | | | | |
|---|---|---|---|---|
| 3,208,306 | A | * | 9/1965 | Lewis ........................... 475/235 |
| 3,673,889 | A | * | 7/1972 | Hauser .......................... 475/230 |
| 3,956,945 | A | * | 5/1976 | Eggleton et al. .............. 475/237 |
| 4,207,780 | A | * | 6/1980 | Saxton .......................... 475/221 |

FOREIGN PATENT DOCUMENTS

| | | |
|---|---|---|
| JP | 3751488 B2 | 3/2006 |
| JP | 2013-072524 A | 4/2013 |

* cited by examiner

*Primary Examiner* — Huan Le
(74) *Attorney, Agent, or Firm* — Carrier Blackman & Associates, P.C.; Joseph P. Carrier; William D. Blackman

(57) ABSTRACT

In a differential device, first and second bearing bosses aligned on a same axis to be rotatably supported by a transmission case are integrally formed on one and another side portions of an integrated differential case housing a differential gear mechanism. Paired sleeves rotatably supported by the bosses are connected liquidtightly to paired left and right side gears of the mechanism. A tube portion is integrally protruded from an outer end of a hub of each gear. The sleeve is screwed and fastened onto an outer periphery of the tube portion. In the gear and sleeve, first and second sealing surfaces are formed respectively to closely adhere to each other by such screwing and fastening, thereby shutting off communication between an inside of the differential case and a screwed portion between the tube portion and sleeve.

4 Claims, 4 Drawing Sheets

DIFFERENTIAL DEVICE

BACKGROUND OF THE INVENTION

1. Field of the Invention

The present invention relates to an improvement of a differential device comprising: a differential gear mechanism; and an integrated differential case housing the differential gear mechanism, the differential case including first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; and a pair of sleeves fitted and inserted to the first and second bearing bosses from outer end sides thereof and respectively connected to a pair of left and right side gears of the differential gear mechanism, wherein oil seals are to be set between outer end portions of the sleeves which protrude from the first and second bearing bosses and the transmission case, and left and right drive shafts are to be fitted and inserted into the sleeves and to be spline-fitted to hubs of the pair of side gears.

2. Description of the Related Art

Such a differential device is known as disclosed in Japanese Patent No. 3751488 and Japanese Patent Application Laid-open No. 2013-72524.

In the above-described differential device, after the differential gear mechanism including the side gears is incorporated into the integrated differential case through the work window, the sleeves are fitted and inserted into the first and second bearing bosses from the outside to be spline-fitted to the side gears. In other words, if the side gear and the sleeve are integrated, a total length thereof becomes longer than an inside diameter of the integrated differential case, and the side gear and the sleeve cannot be incorporated into the differential case.

In the above-described conventional differential device, the sleeve is fastened to the side gear by pressure welding or fusion welding to prevent lubricating oil in the differential case from leaking out of a space between the side gear and the sleeve. However, during assembly, a special process such as pressure welding or fusion welding is an obstacle to improving efficiency of assembly.

SUMMARY OF THE INVENTION

The present invention has been made in view of the above-described circumstances, and an object of the present invention is to provide a differential device in which lubricating oil in a differential case is prevented from leaking out of a space between a side gear and a sleeve without performing a special process such as pressure welding or fusion welding during assembly and which has good ease of assembly.

In order to achieve the object, according to a first aspect of the present invention, there is provided a differential device comprising: a differential gear mechanism; and an integrated differential case housing the differential gear mechanism, the differential case including first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; and a pair of sleeves fitted and inserted to the first and second bearing bosses from outer end sides thereof and respectively connected to a pair of left and right side gears of the differential gear mechanism, wherein oil seals are to be set between outer end portions of the sleeves which protrude from the first and second bearing bosses and the transmission case, and left and right drive shafts are to be fitted and inserted into the sleeves and to be spline-fitted to hubs of the pair of side gears, wherein a tube portion is integrally provided in a protruding manner at an outer end of the hub of each of the side gears, the sleeve is screwed and fastened onto an outer periphery of the tube portion, and in the side gear and the sleeve, first and second sealing surfaces are formed respectively to be brought into tight contact with each other by such screwing and fastening so as to shut off communication between an inside of the differential case and a screwed portion between the tube portion and the sleeve.

According to the first aspect of the present invention, ease of assembly of the differential device is good, and, even when the drive shafts are removed from the differential device, lubricating oil in the transmission case and the differential case does not flow out and good ease of maintenance can be ensured.

In particular, the sleeve can be integrally connected to the side gear by screwing and fastening the sleeve onto the side gear. Moreover, the above-described screwing and fastening can bring the first and second sealing surfaces of the side gear and the sleeve into tight contact with each other, and makes a seal which shuts off communication between the inside of the differential case and a screwed portion between the tube portion of the side gear and the sleeve. Accordingly, a seal member is unnecessary, and liquid tightness between the side gear and the sleeve can be achieved by a simple structure. This can contributes to an improvement in ease of assembly.

According to a second aspect of the present invention, in addition to the first aspect, an annular recessed portion facing an outer periphery of an outer end portion of the tube portion is provided on an inner periphery of the sleeve, and a locknut pressing the sleeve inward in an axial direction is screwed and fastened onto the outer periphery of the tube portion in the annular recessed portion.

According to the second aspect of the present invention, the locknut pressing the sleeve inward in the axial direction can suppress looseness of the screwed portion between the tube portion of the side gear and the sleeve.

According to a third aspect of the present invention, in addition to the second aspect, tapered surfaces pressing each other are formed in the annular recessed portion and the locknut, respectively, and the tapered surfaces are decentered from each other.

According to the third aspect of the present invention, by pressing the tapered surface of the locknut into the tapered surface of the sleeve, lateral pressure in such a direction that an amount of decentering reduces is generated on contact surfaces of the opposite tapered surfaces on one side, and frictional force on a screwed portion between the tube portion and the locknut on one side can be effectively increased. This strengthens a locking function of the locknut with respect to the tube portion and the sleeve, and can effectively prevent the looseness of a screwed portion between the sleeve and the tube portion.

According to a fourth aspect of the present invention, in addition to the first aspect, the first and second sealing surfaces are tapered.

According to the fourth aspect of the present invention, a wedge effect obtained by pressing the second sealing surface of the sleeve into the first sealing surface of the side gear can increase contact pressure between the first and second sealing surfaces and can improve sealability between the opposite sealing surfaces.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Hereinafter, embodiments of the present invention will be described based on the accompanying drawings.

Figure 1:
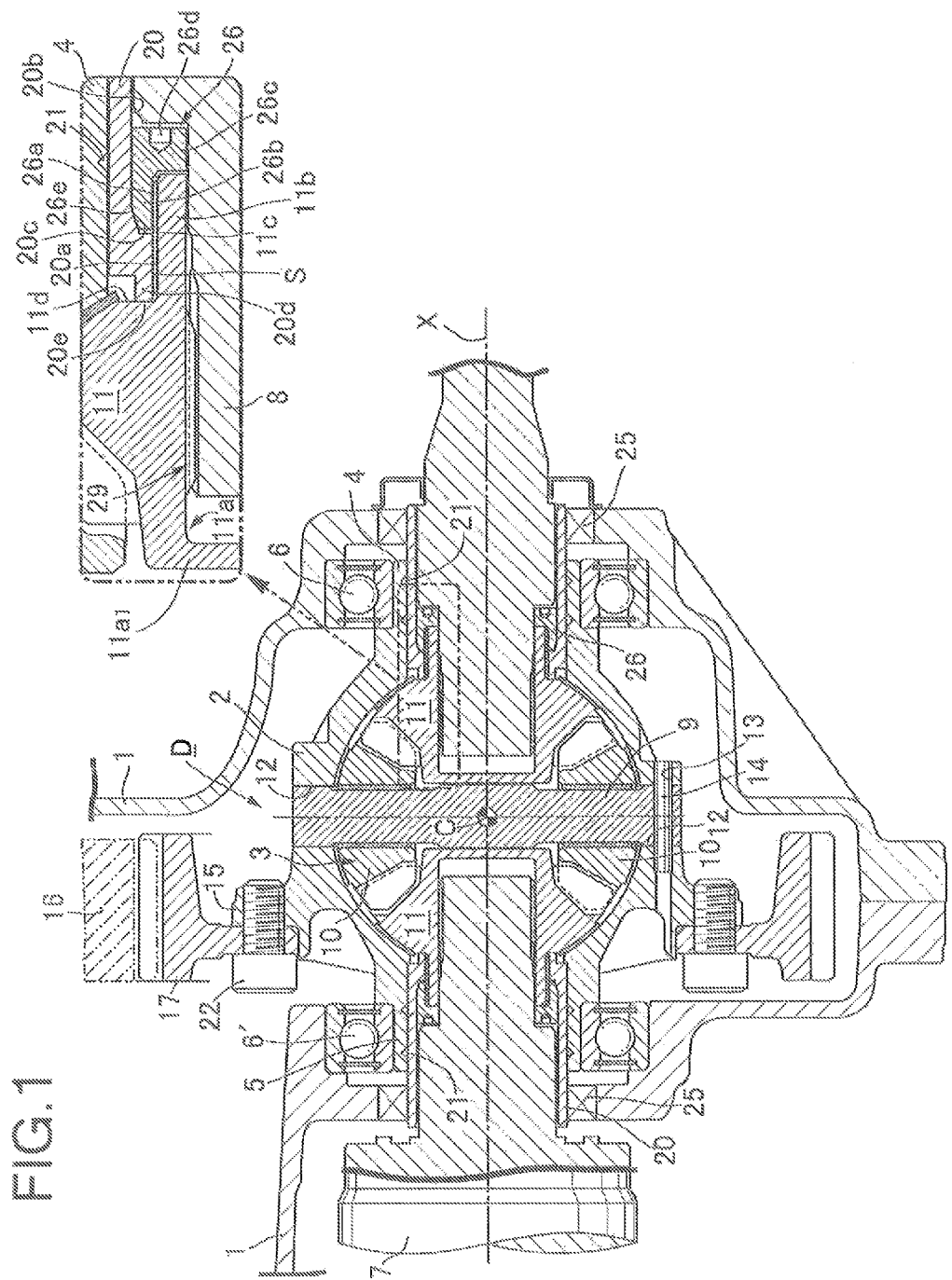
FIG. 1 is a longitudinal sectional elevation view of a differential device according to a first embodiment of the present invention.

First, a first embodiment of the present invention shown in FIGS. 1 and 2 will be described. In FIG. 1, a differential device D is housed in a transmission case 1 of an automobile. This differential device D includes an integrated differential case 2 and a differential gear mechanism 3 housed in the differential case 2. On a right side portion and a left side portion of the differential case 2, a first bearing boss 4 and a second bearing boss 5 aligned on a same axis X are formed integrally therewith. These first and second bearing bosses 4, 5 are supported by the transmission case 1 via bearings 6, 6'.

The differential gear mechanism 3 includes a pinion shaft 9 held by the differential case 2 to pass through a center C of the differential case 2 while being orthogonal to the axis X, a pair of pinion gears 10 supported by the pinion shaft 9, a pair of side gears 11 meshing with the pinion gears 10, and a pair of sleeves 20 screwed and fastened onto the side gears 11 and rotatably supported by the first and second bearing bosses 4, 5, respectively. A back face of each gear is rotatably supported by a spherical inner surface of the differential case 2. Helical lubrication grooves 21 are formed in inner peripheral surfaces of the first and second bearing bosses 4, 5.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves prevention of the falling off of the pinion shaft 9 from the supporting holes 12.

Moreover, the differential case 2 has an annular flange 15 formed integrally therewith on an intermediate portion which is offset from the center C thereof toward the second bearing boss 5 side. A ring gear 17 meshing with an output gear 16 of a gearbox is fastened to the flange 15 with bolts 22.

Figure 2:
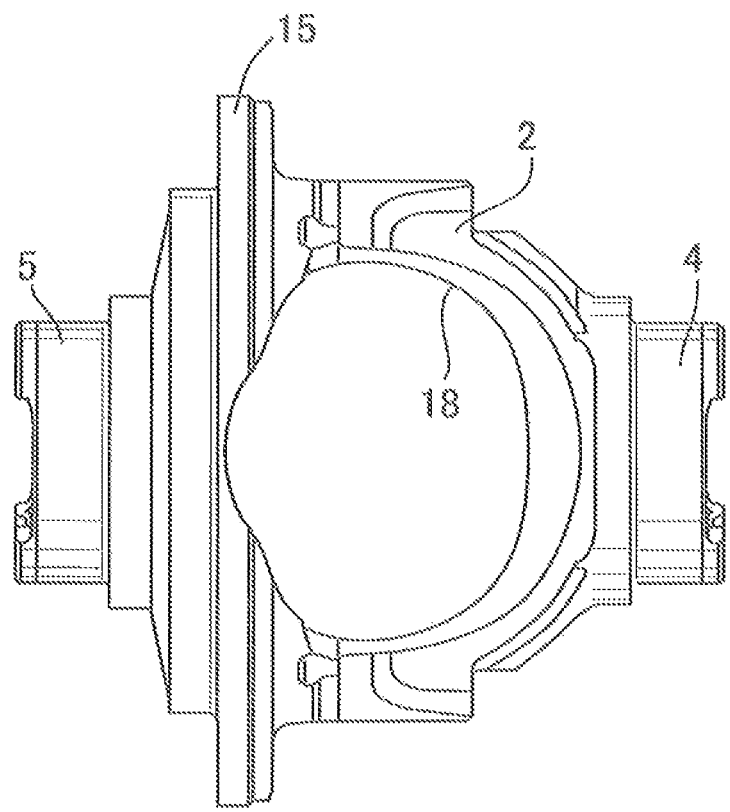
FIG. 2 is an elevation view of a differential case of the above-described differential device.

As shown in FIG. 2, in portions of a peripheral wall of the differential case 2 which face each other on a diametral line orthogonal to the axis X, a pair of work windows 18 for machining the spherical inner surface of the differential case 2 and for facilitating insertion of the differential gear mechanism 3 into the differential case 2 are provided.

Referring again to FIG. 1, the hub 11a of the side gear 11 is formed in a shape of a bottomed cylinder having a bottom portion 11a1 facing toward the pinion shaft 9. At an outer end of the hub 11a, a tube portion 11b is integrally provided in a protruding manner. On an outer periphery of the tube portion 11b, an external thread 11c onto which the sleeve 20 and the locknut 26 are screwed is formed.

Moreover, an annular first sealing surface 11d surrounding a base of the tube portion 11b is formed in the hub 11a.

On an inner periphery of an inner end portion of the sleeve 20, an internal thread 20a is formed which is screwed onto the external thread 11c. Moreover, on an inner periphery of the sleeve 20, an annular recessed portion 20b is provided from an outer end of the internal thread 20a to an outer end of the sleeve 20. At a corner portion of an inner end of the annular recessed portion 20b, a tapered surface 20c is formed. An outer end side half portion of the tube portion 11b which is exposed from an outer end of the external thread 20a faces the annular recessed portion 20b. Moreover, on an inner periphery side of an inner end of the sleeve 20, an annular protruding portion 20d is provided which protrudes inward in an axial direction. At a tip end of the protruding portion 20d, an annular second sealing surface 20e facing the first sealing surface 11d is formed.

Thus, the inner end portion of the sleeve 20 is screwed and fastened onto the outer periphery of the tube portion 11b of the side gear 11 to integrally connect the sleeve 20 to the side gear 11. Moreover, the above-described screwing and fastening brings the first and second sealing surfaces 11d, 20e of the side gear 11 and the sleeve 20 into tight contact with each other to shut off communication between an inside of the differential case 2 and a screwed portion S between the tube portion 11b and the sleeve 20.

The locknut 26 includes a threaded portion 26b having the internal thread 26a to be screwed onto the external thread 11c and an operating portion 26c continuous with an outer end of the threaded portion 26b and more thick-walled than the threaded portion 26b. A tool engagement hole 26d is provided in an outer end surface of the operating portion 26c. On an outer periphery of an inner end portion of the threaded portion 26b, a tapered surface 26e facing the tapered surface 20c is formed.

Thus, the operating portion 26c is operated with a tool to insert the locknut 26 into the annular recessed portion 20b of the sleeve 20 from an outer end thereof and to screw and fasten the locknut 26 onto the outer periphery of the tube portion 11b of the side gear 11. The tapered surface 26e of the locknut 26 is pressed into the tapered surface 20c of the inner end portion of the sleeve 20 to lock the sleeve 20.

Moreover, the sleeves 20 are configured such that outer end portions thereof protrude from the corresponding bearing bosses 4, 5 outward, and oil seals 25 are interposed between the outer end portions and the transmission case 1, respectively.

Left and right drive shafts 7, 8 respectively connected to unillustrated left and right axles pass through the locknuts 26 and the sleeves 20 and are fitted to inner peripheries of the hubs 11a of the side gears 11 via splines 29.

Next, operations of this embodiment will be described.

When the differential device D is assembled, the left and right side gears 11 and the pinion gears 10 are first incorporated into the differential case 2 through the work window 18 in order. The tube portions 11b of the side gears 11 are made to face inner peripheries of the first and second bearing bosses 4, 5. Subsequently, the pinion shaft 9 for supporting the pinion gears 10 is fitted and inserted into the supporting holes 12 of the differential case 2, and the falling-off prevention pin 14 is press-fitted into the differential case 2 and the pinion shaft 9. Then, the left and right sleeves 20 are fitted and inserted into the corresponding first and second bearing bosses 4, 5 from the outer ends thereof. The internal thread 20a of the sleeve 20 is screwed and fastened onto the external thread 11c of the side gear 11 until the second sealing surface 20e of the sleeve 20 comes in tight contact with the first sealing surface 11d of the side gear 11, so as to shut off communication between the inside of the differential case 2 and the screwed portion S between the tube portion 11b and the sleeve 20.

Finally, the locknut 26 is inserted into the annular recessed portion 20b of the sleeve 20 from the outer end thereof. A tool inserted into the tool engagement hole 26d of the locknut 26 is turned to screw and fasten the internal thread 26a of the locknut 26 onto the external thread 11c of the side gear 11. The tapered surface 26e of the threaded portion 26b is pressed into the tapered surface 20c of the sleeve 20.

In this way, the sleeve 20 can be integrally connected to the side gear 11 by screwing and fastening the internal thread 20a of the sleeve 20 onto the external thread 11b of the side gear 11. Accordingly, ease of assembly is good. Also, since the above-described screwing and fastening brings the first and second sealing surfaces 11d, 20e of the side gear 11 and the sleeve 20 into tight contact with each other, a seal is made which shuts off communication between the inside of the differential case 2 and the screwed portion S between the tube portion 11b and the sleeve 20. This eliminates the need for a seal member. Accordingly, liquid tightness between the side gear 11 and the sleeve 20 can be achieved by a simple structure.

Moreover, when the operating portion 26c is operated with a tool to insert the locknut 26 into the annular recessed portion 20b of the sleeve 20 from the outside in the axis direction and to screw and fasten the locknut 26 onto the outer periphery of the tube portion 11b of the side gear 11, and the tapered surface 26e of the locknut 26 is pressed into the tapered surface 20c of the inner end portion of the sleeve 20 to lock the sleeve 20, a wedge effect of the tapered surface 26e of the locknut 26 on the tapered surface 20c of the inner end portion of the sleeve 20 increases contact pressure between the opposite tapered surfaces 26e, 20c and can reduce looseness of the screwed portion S between the side gear 11 and the sleeve 20.

The differential device D assembled as described above is incorporated into the transmission case 1, and oil seals 25 are set between the outer end portions of the sleeves 20 and the transmission case 1. Then, lubricating oil is injected into the transmission case 1. Part of the lubricating oil flows into the differential case 2 through the work windows 18 to be used for lubrication between various portions of the differential gear mechanism 3.

Thus, the lubricating oil in the transmission case 1 is prevented from flowing out of the outer peripheries of the outer end portions of the sleeves 20 by the oil seals 25, and the lubricating oil in the differential case 2 is prevented from flowing out of screwed portions S between the side gears 11 and the sleeves 20 by the tight contact between the first and second sealing surfaces 11d, 20e of the side gears 11 and the sleeves 20. This means that the lubricating oil in the transmission case 1 and the differential case 2 does not flow out even when the drive shafts 7, 8 are removed from the side gears 11.

After the transmission case 1 housing the differential device D is mounted on an automobile, the left and right drive shafts 7, 8 are fitted to the inner peripheries of the hubs 11a of the corresponding side gears 11 via the splines 29.

When the differential device D is activated, rotating torques of the side gears 11 are transmitted to the drive shafts 7, 8 via the splines 29. At this time, the sleeves 20 rotate together with the side gears 11, and the outer peripheral surfaces of the sleeves 20 are lubricated with the lubricating oil held in the lubrication grooves 21 of the first and second bearing bosses 4, 5.

Figure 3:
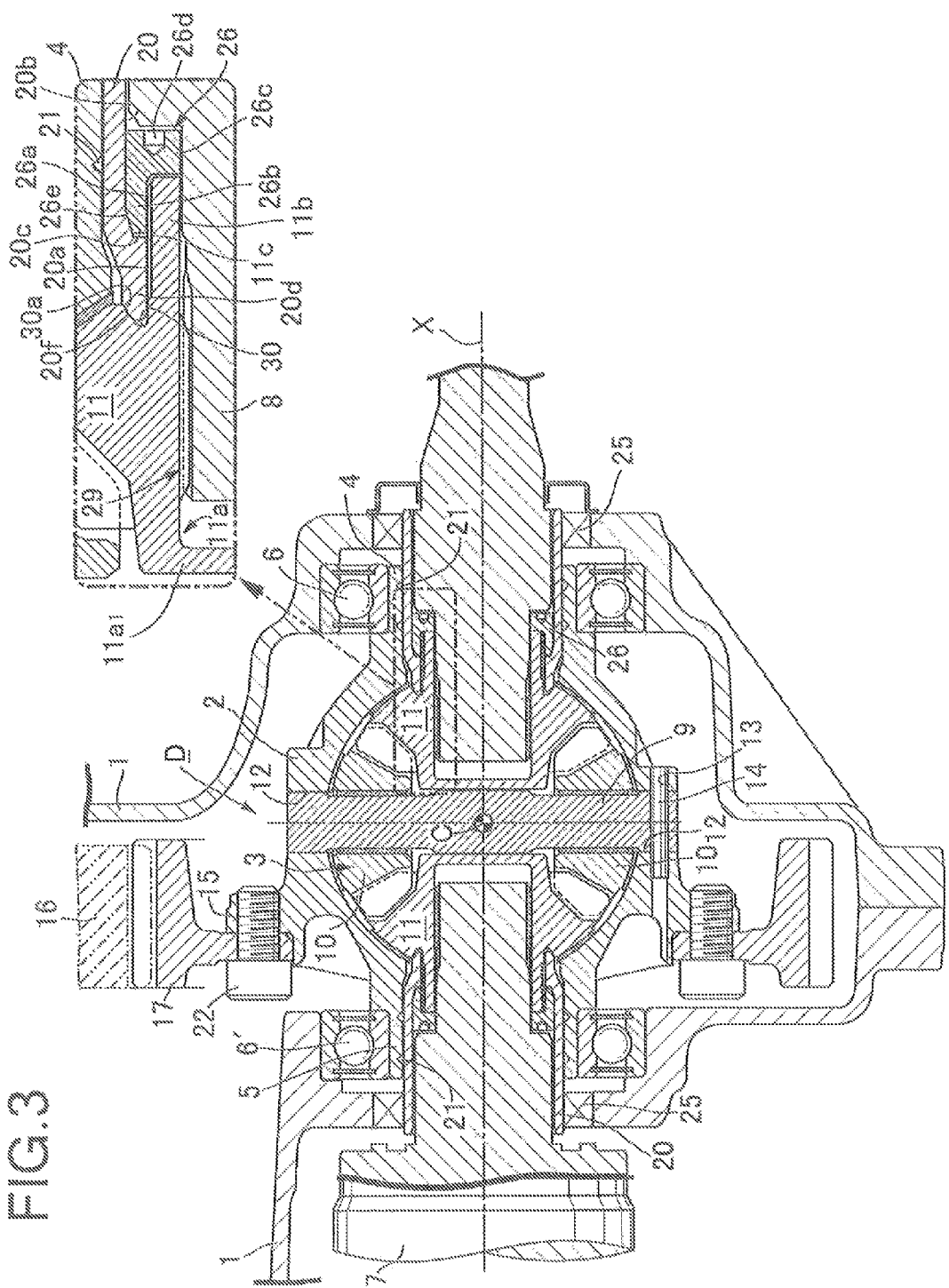
FIG. 3 is a longitudinal sectional elevation view of a differential device according to a second embodiment of the present invention.

Next, a second embodiment of the present invention shown in FIG. 3 will be described.

In this second embodiment, the hub 11a of the side gear 11 is provided with an annular recessed portion 30 which surrounds the base of the tube portion 11b. The recessed portion 30 has a tapered first sealing surface 30a formed on an inner peripheral surface thereof on a large-diameter side. Moreover, a second sealing surface 20f facing the first sealing surface 30a is formed on an outer edge of an inner end of the protruding portion 20d of the sleeve 20. Except for the above-described points, the configuration of this embodiment is substantially the same as that of the previous embodiment. Accordingly, portions corresponding to those of the first embodiment are denoted by the same reference numerals in FIG. 3, and explanations which have already been made in the first embodiment will be omitted.

According to this second embodiment, a wedge effect obtained by pressing the second sealing surface 20f of the sleeve 20 into the first sealing surface 30a of the side gear 11 can increase contact pressure between the first and second sealing surfaces 30a, 20f and can improve sealability between the opposite sealing surfaces 30a, 20f.

Figure 4:
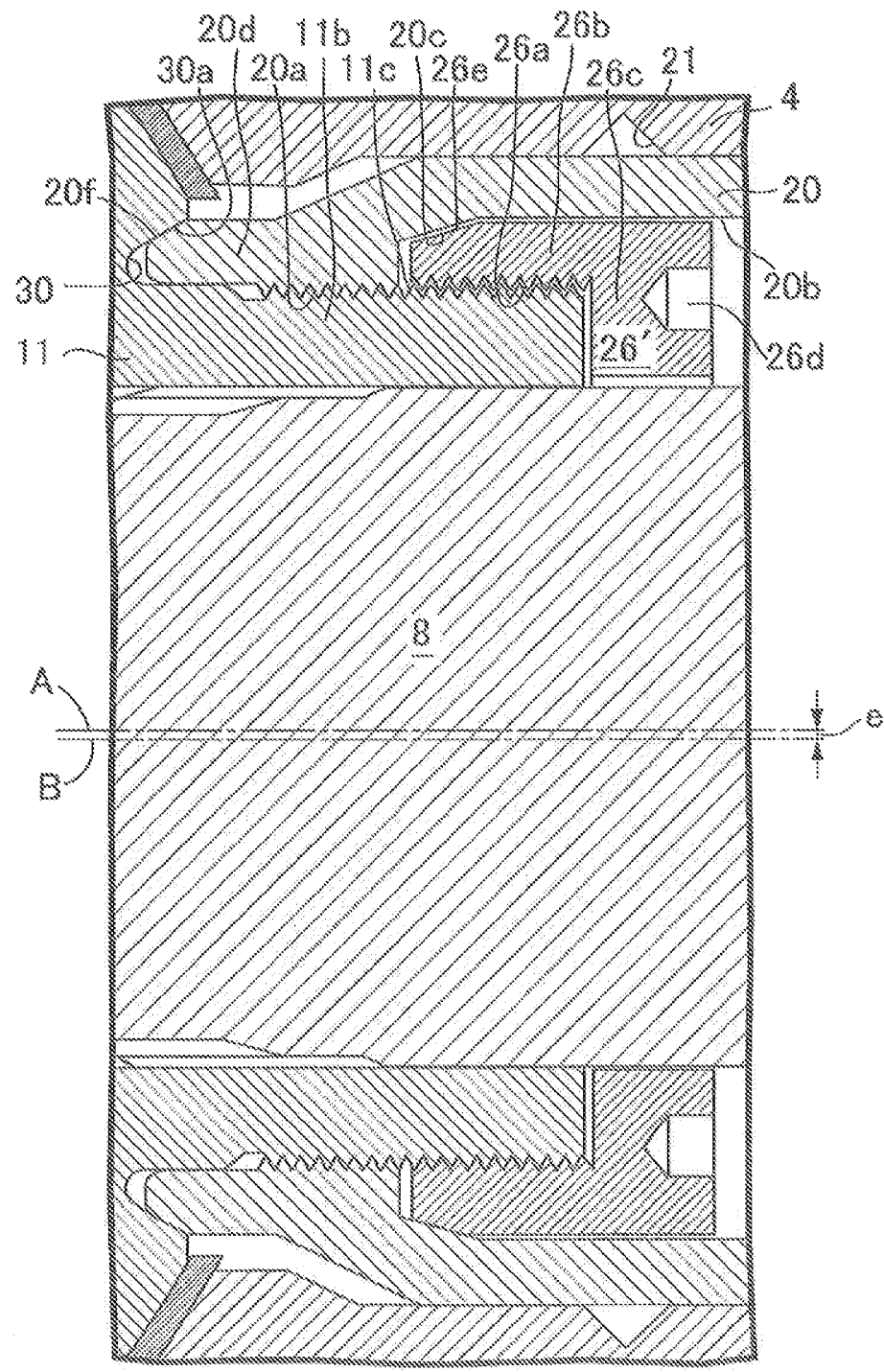
FIG. 4 is an enlarged longitudinal sectional elevation view of a differential device according to a third embodiment of the present invention.

Next, a third embodiment of the present invention shown in FIG. 4 will be described.

In this third embodiment, an axis A of the tapered surface 20c of the sleeve 20 is matched with the axis X of each of the first and second bearing bosses 4, 5, and an axis B of a tapered surface 26e of a locknut 26' is decentered from the axis A by a certain amount e. Except for the above-described points, the configuration of this embodiment is similar to that of the second embodiment. Accordingly, portions corresponding to those of the second embodiment are denoted by the same reference numerals in FIG. 4, and explanations which have already been made in the second embodiment will be omitted.

According to this third embodiment, when the locknut 26' is screwed and fastened onto the tube portion 11b of the side gear 11 to press the tapered surface 26e of the locknut 26' into the tapered surface 20c of the sleeve 20, lateral pressure in such a direction that the amount e of decentering reduces is generated at contact surfaces of the opposite tapered surfaces 20c, 26e on one side, and frictional force on a screwed portion between the tube portion 11b and the locknut 26' on one side effectively increases, because the tapered surface 26e of the locknut 26' is decentered with respect to the tapered surface 20c of the sleeve 20 by the certain amount e. This can strengthen a locking function of the locknut 26' with respect to the tube portion 11b and the sleeve 20, effectively prevent the looseness of the screwed portion S between the sleeve 20 and the tube portion 11b, and maintain for a long time a state in which the first sealing surface 30a of the side gear 11 and the second sealing surface 20f of the sleeve 20 are in tight contact with each other.

It should be noted that in this third embodiment, a similar effect can also be obtained when the axis B of the tapered surface 26e of the locknut 26' is matched with the axis X of each of the first and second bearing bosses 4, 5, and the axis A of the tapered surface 20c of the sleeve 20 is decentered from the axis B by the certain amount e.

The present invention is not limited to the above-described embodiments, but various design changes can be made without departing from the gist thereof. For example, the fastening of the ring gear 17 and the flange 15 with bolts may be replaced by joining by welding. Moreover, to prevent the lubricating oil in the differential case 2 from flowing out into the hubs 11a of the side gears 11, plugs may be press-fitted to the inner peripheries of the hubs 11a in a liquid tight manner instead of the bottom portions 11a1 of the hubs 11a.

What is claimed is:

1. A differential device comprising:
a differential gear mechanism; and
an integrated differential case housing the differential gear mechanism, the differential case including first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; and a pair of sleeves fitted and inserted to the first and second bearing bosses from outer end sides thereof and respectively connected to a pair of left and right side gears of the differential gear mechanism,
wherein oil seals are to be set between outer end portions of the sleeves which protrude from the first and second bearing bosses and the transmission case, and left and right drive shafts are to be fitted and inserted into the sleeves and to be spline-fitted to hubs of the pair of side gears,
wherein a tube portion is integrally provided in a protruding manner at an outer end of the hub of each of the side gears,
the sleeve is screwed and fastened onto an outer periphery of the tube portion, and
in the side gear and the sleeve, first and second sealing surfaces are formed respectively to be brought into tight contact with each other by such screwing and fastening so as to shut off communication between an inside of the differential case and a screwed portion between the tube portion and the sleeve.

2. The differential device according to claim 1, wherein the first and second sealing surfaces are tapered.

3. The differential device according to claim 1, wherein an annular recessed portion facing an outer periphery of an outer end portion of the tube portion is provided on an inner periphery of the sleeve, and a locknut pressing the sleeve inward in an axial direction is screwed and fastened onto the outer periphery of the tube portion in the annular recessed portion.

4. The differential device according to claim 3, wherein tapered surfaces pressing each other are formed in the annular recessed portion and the locknut, respectively, and the tapered surfaces are decentered from each other.

* * * * *